3,060,241
PREPARATION OF ALKYL CYCLOALKYL AND
AROMATIC PHOSPHINES
Michael M. Rauhut, Norwalk, and Andrew M. Semsel, Stamford, Conn., assignors to American Cyanamid Company, New York, N.Y., a corporation of Maine
No Drawing. Filed Nov. 8, 1960, Ser. No. 67,883
4 Claims. (Cl. 260—606.5)

The present invention relates to organophosphorus compounds and to the preparation of same. More particularly, the instant discovery concerns primary, secondary and tertiary aryl, alkyl and cycloalkyl phosphines.

Pursuant to the present invention elemental phosphorus is brought into reactive contact, in the presence of an inert organic solvent, such as diethyl ether, with an organometallic compound selected from the group consisting of an aryl, alkyl, and cycloalkyl lithium or magnesium compound, and the resulting mixture hydrolyzed to produce the corresponding primary, secondary and tertiary organic phosphines.

According to a typical embodiment, finely-divided phosphorus is reacted with phenyllithium in the presence of diethyl ether. The mixture is heated to reflux for several hours and then hydrolyzed with water. The ether solvent is then removed leaving product phenylphosphine.

Typical mono- and di-nuclear aryl lithium and magnesium compounds, alkyl ($C_1$–$C_{12}$) lithium and magnesium compounds and cycloalkyl lithium and magnesium compounds within the purview of the instant invention are: n-butyllithium, n-butylmagnesium bromide, n-butylmagnesium chloride, methylmagnesium iodide, 1-naphthyllithium, 3-(trifluoromethyl)phenyllithium, 4-fluorophenyllithium, 4-methoxyphenyllithium, octylmagnesium bromide, heptyllithium, hexylmagnesium bromide, cyclohexyllithium, n-dodecyllithium, heptafluoropropyllithium, 6-methoxy-2-naphthyllithium, n-propyllithium, 4-tolyllithium, 4-chlorophenyllithium, and the like.

Obviously, from the above list of organometallic compounds, the metallic moiety may or may not be halogenated. Likewise, the organic moiety may or may not be substituted. Typical substituents for the organic moiety are those which under the conditions of the reaction contemplated herein are inert: halogen, such as fluorine and the like, lower alkoxy, such as methoxy, ethoxy, propoxy and butoxy, and like substituents.

The elemental phosphorus reactant may be employed, as indicated hereinabove, as a finely-divided white phosphorus. However, elemental phosphorus in a different physical state, such as molten phosphorus or phosphorus in the form of "chunks," or other similar fractions, may be employed.

As pointed out above, the reactants are brought together in the presence of an inert organic solvent, i.e., a solvent which under the conditions of the reaction described herein does not react to any substantial degree with the reactants. Typical inert solvents are ethers, aromatic hydrocarbons, and the like, such as the following: tetrahydrofuran, diethylether, benzene, toluene, xylene, dimethoxyethane, diethylether of diethyleneglycol, dioxane.

Very good results are obtained, as will be seen hereinafter, by establishing a slurry of finely-divided white phosphorus in an inert organic solvent and a solution of organometallic reactant in an inert organic solvent and adding the latter to the slurry. It has been found, however, that direct admixture of elemental phosphorus with a solution of the organometallic reactant may be employed with satisfactory results. In fact, addition of the phosphorus to the organometallic solution favors the production of a mixture of secondary and tertiary phosphines, but not to the exclusion, of course, of the primary phosphine. This is particularly true when the ratio of organometallic compound to phosphorus is at least 2:1.

Using mixing sequences other than that just defined yields predominantly primary phosphine and lesser amounts of secondary and tertiary phosphines.

As to the ratio of reactants generally employed, at least 1:1, organometallic reactant to phosphorus atom, is employed; preferably, a ratio of about 2:1 up to about 5:1 is used. It will be obvious to the skilled chemist that a substantial excess of the organometallic reactant with respect to the phosphorus reactant, say, on the order of 10:1 or higher, may be employed. In addition, as will be seen hereinafter, other reaction conditions, temperature being typical, modify the ratio of primary, secondary and tertiary products produced.

Hydrolysis of the reaction mixture resulting from the first step of the process contemplated herein is carried out by conventional means using water or dilute mineral acid, such as dilute HCl, $H_2SO_4$, etc., and the resulting products are isolated by distillation under reduced pressure or in an inert atmosphere.

While very desirable results are achieved at ambient temperatures (20° C.–25° C.), it will be obvious to the skilled chemist that a broad range of temperatures may be employed, say, from 0 to 150° C. Good results are achieved by maintaining the reaction mixture under reflux.

By the same token, the process of the present invention may be carried out at atmospheric, sub-atmospheric or super-atmospheric pressure. Batch, continuous or semi-continuous conditions may be employed.

The process of the present invention can be defined generically by the following equation:

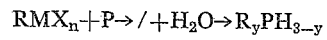
$$RMX_n + P \rightarrow / + H_2O \rightarrow R_yPH_{3-y}$$

wherein R is aryl, substituted aryl, alkyl ($C_1$–$C_{12}$), or cycloalkyl; X is halogen; M is magnesium or lithium; P is phosphorus; n is 0 or 1 and y is a value from 1 to 3.

The present invention will best be understood from the following typical examples:

EXAMPLE I

*Phenylphosphine*

A mixture of 15.5 grams (0.5 gram atom) of white phosphorus and 100 milliliters of dry tetrahydrofuran in a creased flask under nitrogen is heated to 50° C., stirred vigorously and cooled to 30° C. so that the phosphorus solidifies in a finely divided state. A solution of 0.8 mole of phenyllithium in one liter of ether is added dropwise with stirring during one hour. The mixture refluxes gently and the phosphorus dissolved leaves a homogeneous, deep red solution. The solution is refluxed an additional three hours and then hydrolyzed with 400 milliliters of water. An ether phase is separated, dried over anhydrous sodium sulfate, and distilled to obtain 20.1 grams of phenylphosphine, boiling points 53° C.–60° C. (18 millimeters of mercury pressure), identified by comparison of its infra-red spectrum with that of an authentic sample.

Other experiments carried out essentially as above are shown in Table I, infra. In the experiments with organo magnesium compounds the reaction mixtures are hydrolyzed with 10 percent hydrochloric acid, but the hydrolysis mixtures are just neutralized with dilute sodium hydroxide solution and shaken before separation of an organic phase which is formed to avoid loss of basic phosphines.

EXAMPLE II

*Phenylphosphine, Diphenylphosphine, Triphenylphosphine*

White phosphorus (31.0 grams, one gram atom) is cut into pea-sized pieces under water, washed with acetone and with ether, and added under nitrogen to a solution of 2.0 moles of phenyllithium in 1500 milliliters of ether. The mixture is stirred and the temperature gradually rises to reflux during 30 minutes. Refluxing continues 45 minutes, and the mixture is stirred an additional 4 hours at room temperature. A homogeneous, dark red solution is obtained. Carbonation of a 50-milliliter aliquot gives only a trace of benzoic acid, indicating virtually complete reaction of the phenyllithium. The reaction mixture is hydrolyzed with 400 milliliters of water. The ether phase is separated, dried over anhydrous sodium sulfate, and distilled to obtain 30.2 grams (27 percent by weight of theory) of phenylphosphine, boiling point 56° C.–60° C. (18 millimeters of mercury pressure), 11.5 grams (6 percent by weight of theory) of diphenylphosphine, boiling point 103° C.–106° C. (0.1 millimeter of mercury pressure), and 13.3 grams (5 percent by weight of theory) of triphenylphosphine, boiling point 170° C.–177° C. (0.05 millimeter of mercury pressure), melting point 73° C.–76° C.

Diphenylphosphine is identified by comparison of its infrared spectrum with that of an authentic sample and triphenylphosphine by comparison of its infrared spectrum and by means of a mixed melting point with an authentic sample. Analogous experiments carried out essentially as in the instant Example II are shown in Table I, infra. Likewise, product analysis is essentially the same, i.e., by comparison with authentic samples.

EXAMPLES III–XXI

The following table further illustrates the process of the present invention, the examples in the table being carried out, as indicated, essentially as in Examples I and II, above:

theory, i.e., based upon 100 percent theoretical conversion calculated from the weight of the reactants.

It can be seen that the process of the present invention provides a novel, straightforward and ready route to numerous organic phosphines. These phosphines have a number of uses. For example, they have direct utility as gasoline additives, since up to about 10 milliliters of anyone of these phosphines, when dissolved in one gallon of gasoline, affords protection against misfiring, surface ignition, and the like.

Clearly, the instant discovery encompasses numerous modifications within the skill of the art. Consequently, while the present invention has been described in detail with respect to specific embodiments thereof, it is not intended that these details be constructed as limitations upon the scope of the invention, except insofar as they appear in the appended claims.

We claim:

1. A method of preparing organic phosphines which comprises (a) reacting elemental phosphorus, in the presence of an inert organic solvent, with an organo-metallic compound of the formula $RMX_n$, wherein R is a member selected from the group consisting of alkyl having from 1 to 12 carbon atoms, cycloalkyl, aryl and substituted aryl, said substituents being selected from the group consisting of halogen and lower alkoxy; M is a member selected from the group consisting of lithium and magnesium; X is halogen; and $n$ represents 0 and 1; (b) hydrolyzing the products of said reaction; (c) and recovering the resulting corresponding organic phosphines of the formula $R_yPH_{3-y}$, wherein R is as defined above; P is phosphorus and $y$ is a value from 1 to 3.

2. The process of claim 1 wherein $RMX_n$ is phenyllithium and $R_yPH_{3-y}$ is a member selected from the group consisting of phenylphosphine, diphenylphosphine and triphenylphosphine.

3. The process of claim 1 wherein $RMX_n$ is butyl magnesium bromide and $R_yPH_{3-y}$ is a member selected from the group consisting of butylphosphine and dibutylphosphine.

TABLE I

| Example No. | Organometallic | Mole ratio, Org. Met.: P atom | Inert organic solvent | Temperature (°C.) | Process according to example | Primary phosphine | Secondary phosphine | Tertiary phosphine |
|---|---|---|---|---|---|---|---|---|
| III | Phenyllithium | 3:2 | Et₂O:THF [2] 10:1 | 37 | I | Phenylphosphine | | |
| IV | ____do____ | 2:1 | Et₂O | 35–40 | II | ____do____ | Diphenylphosphine | Triphenylphosphine |
| V | Phenyllithium [1] | 2:1 | Et₂O | 29 | II | ____do____ | | |
| VI | Phenyllithium | 3:2 | Et₂O:φH [3] 15:4 | 0 | I | ____do____ | | |
| VII | ____do____ | 3:2 | THF [2] | 35–40 | I | ____do____ | | |
| VIII | Phenylmagnesium Bromide | 2:1 | Bu₂O | 100–104 | II | | Diphenylphosphine | |
| IX | ____do____ | 1:1 | THF [2] | 71 | I | Phenylphosine | | |
| X | ____do____ | 3:2 | THF [2] | 70 | I | ____do____ | | |
| XI | ____do____ | 1:1 | THF [2] | 70 | I | ____do____ | | |
| XII | ____do____ | 1:1 | Et₂O | 38 | II | ____do____ | | |
| XIII | Butyllithium | 2:1 | Et₂O | reflux | II | Butylphosphine | Dibutylphosphine | |
| XIV | Butylmagnesium Bromide | 2:1 | Et₂O | 30 | II | ____do____ | ____do____ | |
| XV | 1-Naphthyllithium | 1:1 | Benzene | 50 | II | Naphthylphosphine | Dinaphthylphosphine | Trinaphthylphosphine |
| XVI | 4-Methoxyphenyllithium | 4:1 | Et₂O | 30 | I | 4-methoxyphenylphosphine | | |
| XVII | 4-Fluorophenyllithium | 3:2 | Dioxane | reflux | I | 4-fluorophenylphosphine | | |
| XVIII | Octylmagnesium Bromide | 2:1 | Toluene | reflux | II | Octylphosphine | Dioctylphosphine | Trioctylphosphine |
| XIX | Cyclohexylmagnesium Bromide | 2:1 | Dioxane | 55 | II | Cyclohexylphosphine | | |
| XX | n-Dodecyllithium | 1.5:1 | Dimethoxyethane | 25 | I | Dodecylphosphine | | |
| XXI | n-Butylmagnesium Iodide | 6:1 | THF [2] | 25 | I | n-butylphosphine | | |

[1] Treated with LiAlH₄ before hydrolysis.
[2] Tetrahydrofuran.
[3] φ equals C₆H₅.

Generally, in the above table, where a blank (____) appears for the primary, secondary or tertiary phosphine products it is an indication that less than about 5 percent by weight of the phosphine is produced, based upon 4. The process of claim 1 wherein reaction is made to take place at a temperature in the range of 0° C. to 150° C.

No references cited.